Dec. 29, 1970  R. TEMPLE ET AL  3,550,274
EXPLOSIVELY ACTUATED CUTTING TOOL
Filed Dec. 31, 1968  2 Sheets-Sheet 2
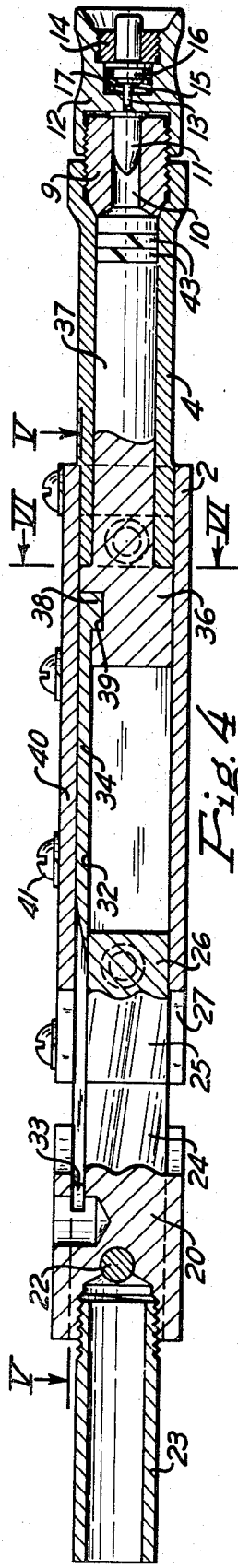
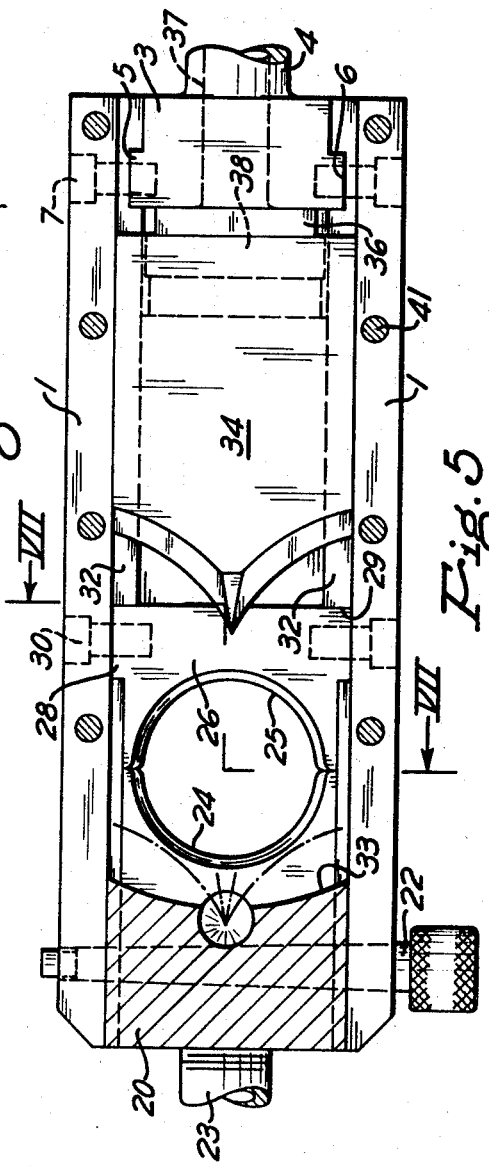
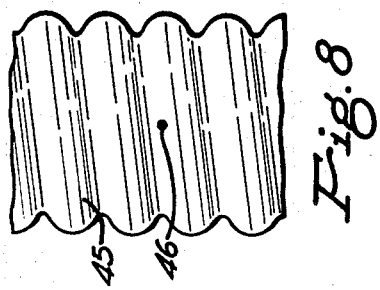
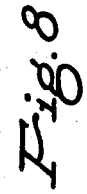
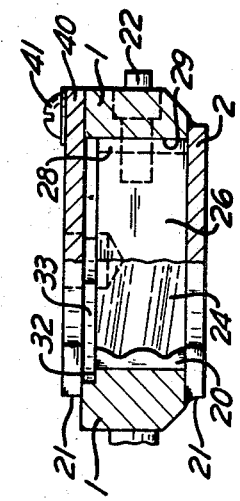
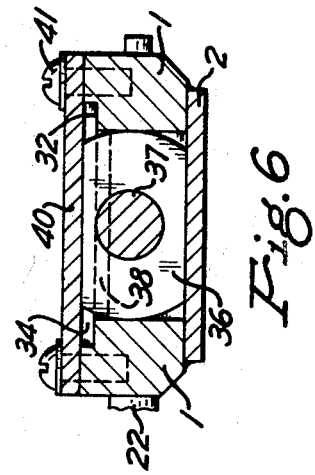
INVENTORS.
ROBERT TEMPLE
ERNEST E. TEMPLE
JOSEPH L. GIEBEL
BY
Brown, Critchlow, Flick & Peckham
ATTORNEYS.

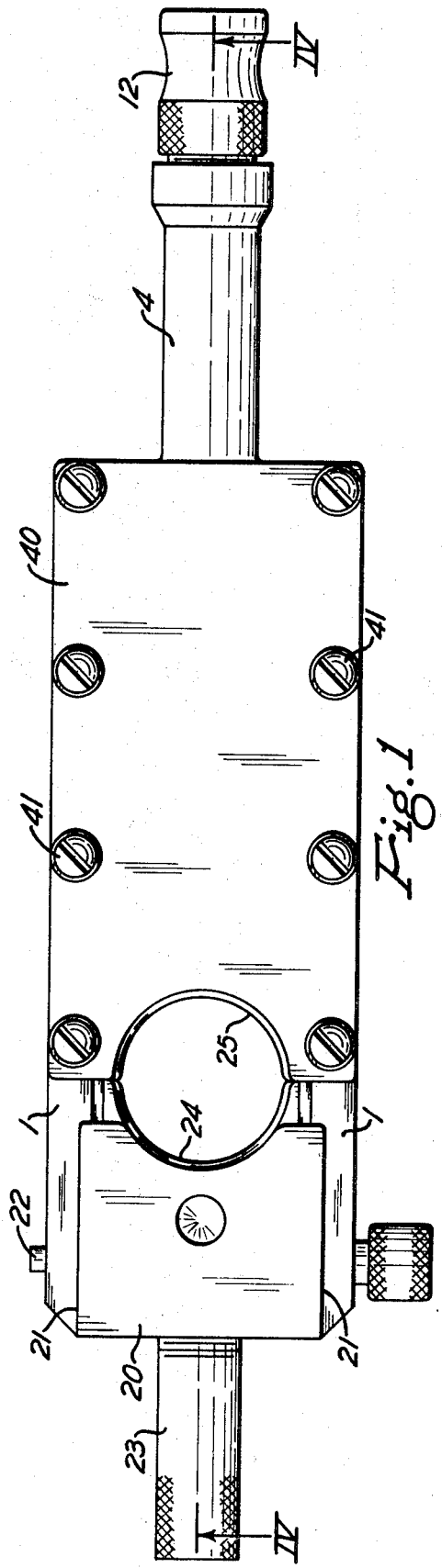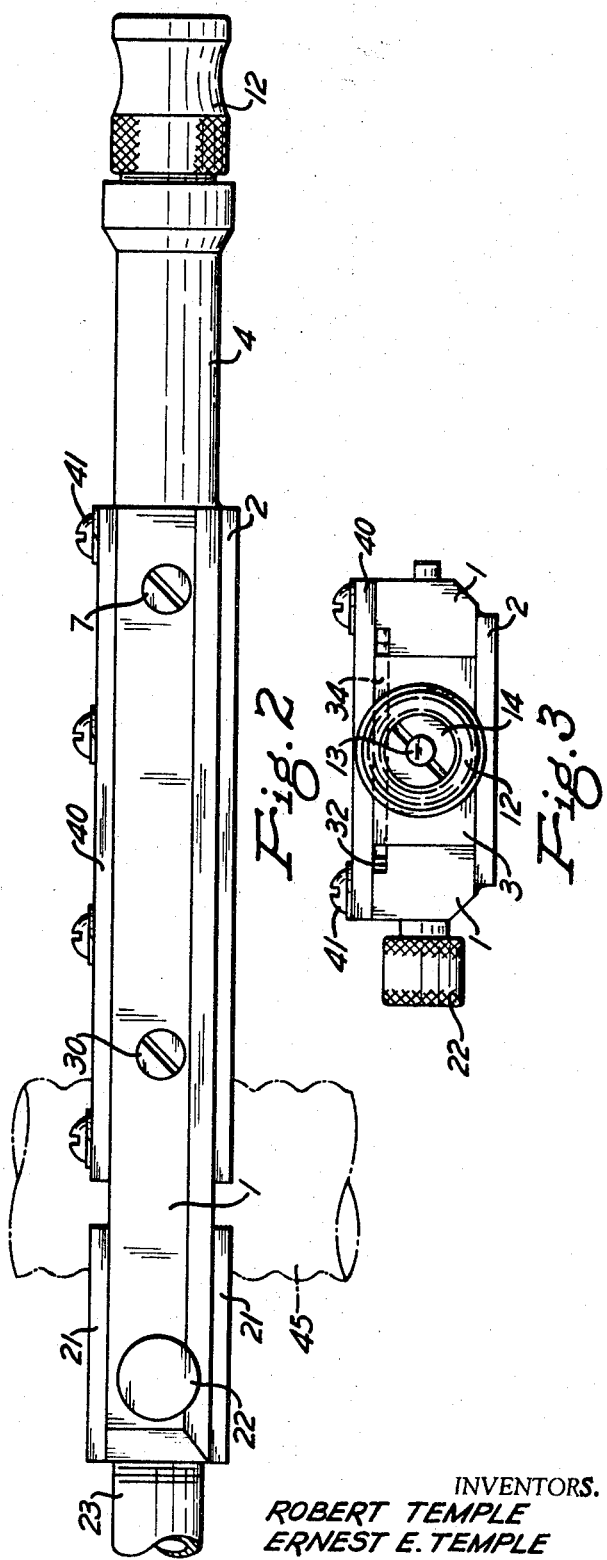

United States Patent Office 3,550,274
Patented Dec. 29, 1970

3,550,274
EXPLOSIVELY ACTUATED CUTTING TOOL
Robert Temple, Pittsburgh, Ernest E. Temple, Murrysville, and Joseph L. Giebel, Pittsburgh, Pa., assignors to Mine Safety Appliances Company, Pittsburgh, Pa., a corporation of Pennsylvania
Filed Dec. 31, 1968, Ser. No. 788,257
Int. Cl. B26b 15/00
U.S. Cl. 30—228          15 Claims

ABSTRACT OF THE DISCLOSURE

A frame has recessed longitudinal guideways in the tops of its sidewalls for receiving a plate-like blade that is held in place by a removable cover plate. Secured to the back end of the frame is a barrel that has a cartridge chamber at its back end. The piston in the barrel is provided in the back of the frame with a head, to which the rear end of the blade is detachably connected. Front and rear die blocks are mounted in the frame at the front end of the blade and are recessed to provide a vertical opening for receiving a workpiece. The cutting end of the blade is movable completely across the opening to sever the workpiece when a cartridge is fired in said chamber to drive the piston and blade forward.

---

A tool is known in which a single blade is driven forward in a frame by means of an explosive charge behind a piston connected to the blade. The blade is projected across an opening formed by die blocks for holding a workpiece which the blade cuts in two. When the blade needs resharpening or replacing, it is somewhat of a chore to remove it from the piston and the frame because the edges of the blade are mounted in parallel grooves in opposite sides of the frame midway between its top and bottom. Attempts have been made to use such a tool for cutting coaxial cable, in which an inner conductor is spaced from an outer conductor made from a helically corrugated copper tube, but they have not been successful because the blades crushed or otherwise deformed the severed ends of the cable so that they could not be used.

It is among the objects of this invention to provide an explosively actuated cutting tool which is of simpler construction than those known heretofore, which is smaller and lighter, in which the cutting blade can quickly and easily be removed and replaced, and which is especially adapted to cut coaxial cables satisfactorily.

The preferred embodiment of the invention is illustrated in the accompanying drawings, in which FIG. 1 is a plan view of the tool;
FIG. 2 is a side view;
FIG. 3 is a rear end view;
FIG. 4 is a longitudinal section taken on the line IV—IV of FIG. 1;
FIG. 5 is a longitudinal section taken on the line V—V of FIG. 4;
FIG. 6 is a cross section taken on the line VI—VI of FIG. 4;
FIG. 7 is a cross section taken on the line VII—VII of FIG. 5; and
FIG. 8 is a side view of a coaxial cable, partly in section, showing the point at which the blade first pierces the outer tube.

Referring to the drawings, a frame is formed from a pair of spaced parallel side members or bars 1, the bottoms of which are welded to a base plate 2, on the edges of which they rest. This base plate extends from the rear ends of the bars forward but preferably not entirely the full length of the bars. As shown in FIGS. 4 and 5, the back end of the frame is formed by the enlarged front end 3 of a barrel 4 that extends rearwardly from the frame. This rectangular large portion engages the two side bars and is provided with lateral projections 5 that fit in notches 6 in the inner sides of the bars. The barrel is detachably connected to the frame by screws 7 that extend through openings in the bars and are threaded in holes in projections 5.

As shown in FIG. 4, screwed into the rear end of the barrel is a plug 9 that is provided with an axial opening through it to form cartridge chamber 10. An explosive cartridge 11 can be held in this chamber by a breech block 12 screwed onto the rear end of the block. The breech block has an axial opening through it, the reduced front end of which contains the front end of a firing pin 13. The rear end of the pin is slidably mounted in a ring 14 screwed into the back of the breech block. The pin normally is held in its rear position by a coil spring 15 compressed between a collar 16 on the pin and a shoulder 17 in the breech block. The cartridge can be fired by striking the rear end of the pin with a hammer or the like.

Removably mounted in the front end of the frame there is a front die block 20, as shown in FIGS. 1, 4, 5 and 7. This die block is thicker than the frame and preferably has laterally projecting top and bottom flanges 21 that engage the upper and lower surfaces of the side bars. The block is inserted in the frame by sliding it into the front end. It is held in position by a tapered pin 22 that extends through aligned tapered passages through the side bars and the front die block. When the pin is removed, the block can be pulled out of the frame by a short handle 23 screwed into its front end. The rear or inner end of the block is provided with an arcuate recess 24 for receiving half of a workpiece extending down through the frame. The other half of the workpiece is received by an arcuate recess 25 in the front end of a rear die block 26, the two recesses forming a circular opening. The rear die block is not as thick as the side bars. It engages the base plate 2 of the frame, which is provided with a recess 27 that registers with die block recess 25. The rear block has lateral projections 28 that extend into notches 29 in the side bars, and the block is locked therein by set screws 30 extending through side bars and threaded into the block.

The tops of side bars 1 are recessed to form longitudinal guideways extending forward from their rear ends. These guideways open upwardly and inwardly and therefore form ledges 32 in the side bars. The top of the rear die block 26 is at the same level as the ledges, and the inner or rear end of the front die block is provided with a transverse slot 33, the bottom of which is at that same level and the top of which is in the plane of the top of the side bars. Resting on the ledges are the opposite edges of a plate like blade 34, the front end of which tapers to a point that overlies the back of the rear die block. This tapered portion of the blade is ground to a very sharp edge. The bottom of the tapered end is flat, but the top is bevelled along the cutting edge.

The rear end of the blade is detachably connected with the head 36 of a piston 37, as shown in FIGS. 4, 5 and 6. The head normally is located at the back of the inside of the frame against the front end of the barrel, with the rest of the piston extending back in the barrel to cartridge chamber 10. The connection between the blade and the piston head is formed by providing one of them with a vertical projection and the other with a recess that receives the projection. Preferably, the bottom of the blade is provided at its rear end with a transverse rib 38 that extends down into a transverse slot 39 in the top of the piston head. To hold the rib in the head and also hold the blade in the frame, a cover plate 40 overlies the blade and is secured to the tops of the side bars by means of screws 41 so that it can quickly be removed. The front end of this cover plate is recessed to register with the arcuate recess in the rear die block.

In order to operate this tool, the tapered pin 22 is removed from the front die block and then that block is pulled out of the frame by means of handle 23. A workpiece then is inserted laterally between the front ends of the side bars into recess 25 in the rear die block. After the cable has been inserted in the frame, the front die block is replaced and the tapered pin is driven into it to hold the cable securely in place. Assuming that the cartridge is in the cartridge chamber and the piston is in its rear position as shown in FIGS. 4 and 5, the cartridge is discharged by tapping the firing pin. The force of the explosion drives the blade forward in its guideways. To delay forward movement of the piston until the gas pressure produced by the fired cartridge can build up to a predetermined value, the rear end of the piston is provided with an annular groove, in which at least one, and preferably two split metal piston rings 43 are disposed side by side. The rings press outwardly against the barrel tightly enough to require more pressure than otherwise would be the case to start the piston moving forward. As the cutting edge of the blade moves forward across the rear die block and into slot 33 in the front die block it passes through the cable and thereby severs it. The portion of the cable held by the die blocks then can be removed by first removing the front die block as before.

Whenever it becomes necessary to sharpen the blade or two replace it, all that has to be done is to remove screws 41 to free the cover plate and then the blade can be lifted out of the frame. There are no fasteners securing it to the piston. This tool is lighter and smaller and cheaper than similar tools because the blade is directly beneath the cover plate.

Since this tool is designed especially for cutting coaxial cable, the outer copper tube 45 of which is corrugated helically as shown in FIG. 8, the die block recesses are contoured to fit the corrugation. Moreover, it is important that the corrugation-receiving groove in the die recesses be so positioned that it will hold the cable in a position in which a point 46 about midway between the crest of a cable corrugation and the base of the cable groove directly above it will be directly in front of the point of the blade so that the tube will be pierced by the blade at that particular point. If it is pierced above or below that point a clean cut will not be made because the severed edge in the plane of the bottom of the blade will be rolled in and deform by the blade. Furthermore, in order to cut properly, the cutting edges of the blade must be straight or concave, preferably the latter as shown. If the included angle between those edges is more than about 110°, they will not slope back enough to cut properly. On the other hand, if the angle is less than about 90°, the tapered portion of the blade will be so long that the tendency of the cable to deflect the point downwardly may cause the point to strike the upper edge of the recess in the outer die. Therefore, the angle in question should be between approximately 90° and 110°.

With the cable-receiving opening in the tool properly contoured and the blade properly shaped, the portion of the cable held in the tool will be provided with a good clean cut and free of chips. The portion of the cable above the tool, however, will be provided with a rolled in and deformed end, due to the thickness of the blade. If it is necessary that this portion of the cable also have a good end, it can be turned end for end and inserted in the tool with the bad end projecting above the tool. When the tool is operated again, the part of the cable clamped in the tool will be cut off clean.

We claim:

1. An explosively actuated cutting tool comprising a channel-like frame having front and back ends, the frame being formed from spacerd parallel side members connected by a bottom wall, a barrel secured to the back end of the frame and extending rearwardly therefrom and having a cartridge chamber at its back end, a piston in the barrel provided in front of the barrel with a head normally located at the back of the inside of the frame, the tops of said side members having recessed longitudinal guideways therein opening upwardly and inwardly to form ledges, a plate-like blade extending across the frame and resting on said ledges, the rear end of the blade being detachably connected to said piston head and the front end having a cutting edge, a removable cover plate fastened to the tops of said side members and holding the blade on the ledges, a rear die block mounted in the frame at the front end of the blade, the top of the block being at substantially the same level as said ledges to permit the blade to slide forward across the block, a removable front die block mounted in the frame in front of the rear die block, the opposed ends of the die blocks being recessed to provide a vertical opening for receiving a workpiece extending vertically through the frame, the cutting end of the blade being movable completely across said opening to sever a workpiece therein, and means at the back end of said barrel for firing a cartridge in said chamber to drive the piston and blade forward.

2. A cutting tool according to claim 1, in which the detachable connection between said blade and piston head includes a vertical projection on one and a recess in the other receiving the projection.

3. A cutting tool according to claim 2, in which said projection is a transverse rib on the bottom of the blade, and said recess is a transverse slot in the top of said head.

4. A cutting tool according to claim 1, in which the front end of said cover plate terminates over said rear die block.

5. A cutting tool according to claim 1, in which the front end of said cover plate overlies said rear die block, and said front die block extends above the frame and is provided with a horizontal slot in the path of the blade for receiving the front end thereof.

6. A cutting tool according to claim 1, in which the front ends of said bottom wall and cover plate terminate behind said front die block, and the front die block projects above and below said side members and laterally across them to prevent vertical movement of the block in the frame, and said tool including removable means for normally holding the front die block in operative position in the frame.

7. A cutting tool according to claim 6, in which said removable means is a tapered pin, and said side members and front die block are provided with normally aligned transverse passages therethrough tightly receiving said pin.

8. A cutting tool according to claim 1, in which said barrel is provided with an enlarged front end portion between the back ends of said side members and forming the back wall of the frame, and means holding said portion in the frame.

9. A cutting tool according to claim 1, in which the detachable connection between said blade and piston head includes a vertical projection on one and a recess in the other receiving the projection, the front end of said cover plate overlies said rear die block, and said front die block extends above the frame and is provided with a horizontal slot in the path of the blade for receiving the front end thereof.

10. A cutting tool according to claim 1, in which the cutting end of the blade is tapered to a central point and has cutting edges inclined from the point rearwardly to the sides of the blade, said cutting edges being straight or concave, and the included angle between the cutting edges being between approximately 90° and 110°.

11. A cutting tool according to claim 10, in which the bottom of the tapered end of the blade is flat, and the top of the tapered end is bevelled along said cutting edges.

12. A cutting tool according to claim 1, in which the rear end of said piston is provided with an annular groove, and a split metal piston ring is disposed in said groove and presses out against the inner surface of said band with enough force to delay forward movement of the piston until the gas pressure produced by a fired cartridge in said chamber increases to a predetermined value.

13. A cutting tool according to claim 1, in which the wall of said workpiece receiving opening is provided with a helical groove for snugly receiving the corrugation of a helically corrugated tubular workpiece.

14. A cutting tool according to claim 13, in which the cutting end of the blade is tapered to a central point and has cutting edges inclined from the point rearwardly to the sides of the blade, and the position of said helical groove in said opening is such that the blade point will pierce a corrugation of said workpiece above the crest of that corrugation.

15. A cutting tool according to claim 13, in which the cutting end of the blade is tapered to a central point and has cutting edges inclined from the point rearwardly to the sides of the blade, the bottom of the tapered end of the blade is flat, the top of the tapered end is bevelled along said cutting edges, and the position of said helical groove in said opening is such that the blade point will pierce a corrugation of said workpiece above the crest of that corrugation.

References Cited
UNITED STATES PATENTS

| | | | |
|---|---|---|---|
| 2,766,525 | 10/1956 | Hoffman | 30—272X |
| 2,916,823 | 12/1959 | Mittanck. | |
| 3,353,267 | 11/1967 | Temple et al. | 30—180 |

GRANVILLE Y. CUSTER, JR., Primary Examiner